United States Patent Office 2,864,777
Patented Dec. 16, 1958

2,864,777

METHOD FOR PRODUCING POROUS FILMS FROM A POLYVINYL CHLORIDE PLASTISOL CONTAINING WATER AS THE BLOWING AGENT

Joe A. Greenhoe, Longmeadow, Mass., assignor to Monsanto Chemical Company, St. Louis, Mo., a corporation of Delaware No Drawing. Application July 27, 1956
Serial No. 600,397

3 Claims. (Cl. 260—2.5)

The present invention relates to porous films of vinyl chloride polymers and to methods for preparing same.

There are many important industrial applications for porous or air-permeable films of vinyl chloride polymers. The presently employed methods for preparing such porous films comprises preparing a non-porous film by conventional techniques and subsequently punching holes in said film by mechanical means.

It is an object of this invention to provide a method for preparing porous films of vinyl chloride polymers.

Another object of this invention is to provide a method for preparing porous films of vinyl chloride polymers that can be readily adapted to continuous production methods.

Other objects and advantages of this invention will become apparent in the following detailed description thereof.

It has been discovered that porous films of vinyl chloride polymers can be prepared by forming a film from a vinyl chloride polymer plastisol or organosol which has water dispersed therein and subsequently heating the film to fuse the vinyl chloride polymer and plasticizer. The resulting product is a continuous plasticized vinyl chloride polymer film having a plurality of small pores or openings therein.

The following examples are set forth to illustrate more clearly the principle and practice of this invention to those skilled in the art. All parts are by weight.

*Example I*

A plastisol is prepared by dispersing 100 parts of a vinyl chloride homopolymer having an average particle size of 1 micron in 80 parts of di(2-ethylhexyl)phthalate, and five parts of water are then incorporated in the plastisol. A 10 mil film of the plastisol is coated on glass and fused by heating the film for 5 minutes at 185° C. The resulting film is strong and flexible and has a plurality of small pores throughout the film.

*Example II*

A plastisol is prepared from 100 parts of vinyl chloride homopolymer, 30 parts of di(2-ethylhexyl)phthalate, 20 parts of di(2-ethylhexyl)adipate and 2 parts of dibasic lead phosphite. Two parts of a nonionic surface-active agent are added to the plastisol and 10 parts of water are then emulsified therewith. A 5 mil film of the plastisol is prepared on glass and fused in hot air for 5 minutes at 185° C. A tough, clear porous film is obtained.

*Example III*

A plastisol is prepared from 100 parts of a vinyl chloride homopolymer, 100 parts of diisodecyl phthalate, 50 parts of calcium carbonate filler, 25 parts of clay filler, 2 parts of aluminum stearate and 2 parts of barium laurate. Five parts of water are homogeneously incorporated into the plastisol and a 10 mil film thereof is coated on glass. A porous film is obtained by heating the film for 5 minutes at 180° C.

*Example IV*

A plastisol is prepared from 100 parts of a copolymer containing 95% vinyl chloride and 5% vinyl acetate and 80 parts of tricresyl phosphate. One part of a nonionic surface agent is added to the plastisol and 50 parts of water are then emulsified therewith. The water-containing plastisol is knife-coated on cotton cloth and the film is fused by heating for 1 minute at 195° C. A supported porous film is obtained which is suitable for use as an upholstering material.

The vinyl chloride polymer plastisols employed in the process of this invention are conventional except for the fact that they have water incorporated therein. The quantity of water incorporated in the plastisol may vary from as little as about 2 parts of water per 100 parts of vinyl chloride polymer to the quantity of water that can be incorporated into the plastisol without causing phase inversion of the plasticizer and water. Preferably 2–50 parts and more especially 5–20 parts of water are incorporated in the plastisol for each 100 parts of vinyl chloride polymer contained therein. In some cases it is desirable to incorporate an emulsifying agent into the plastisol to obtain a homogeneous distribution of the water throughout the plastisol, cf. Example II. In lieu of using water per se, it is also possible to employ progenitors thereof which liberate water at or below the temperature employed to fuse the plastisol. Typical examples of such water progenitors include hydrated salts which liberate water below about 150° C.

Vinyl chloride polymer plastisols per se are well-known in the art and as a result are not described herein in detail. In general, such plastisols comprise a dispersion of a finely divided vinyl chloride polymer, e. g., average particle size of 0.02–2.0 microns, in a plasticizer therefor. In the usual case 100 parts of the vinyl chloride polymer is dispersed in from 50 to 200 parts of the plasticizer. In some cases, the plastisol may also have small quantities of one or more volatile organic solvents incorporated therein. Such solvent containing plastisols are sometimes referred to in the art as "organosols." The vinyl chloride polymers employed in the plastisols may be homopolymers of vinyl chloride or copolymers of vinyl chloride with vinyl acetate, vinylidene chloride, acrylate esters, etc. The plasticizers employed are usually of the ester type such as di(2-ethylhexyl)phthalate, dibutyl phthalate, diisodecyl phthalate, tricresyl phosphate, etc. Fillers, stabilizers, colorants, and other conventional plastisols ingredients may be included if desired.

The films of the water-containing vinyl chloride polymer plastisol can be prepared by any conventional film-forming method such as knife-coating, spraying, reverse roll coating, calendering, etc. The plastisol films are gelled and converted into a continuous plastic film by heating to temperatures of about 150° C. or above by any conventional heating means such as hot air ovens, infrared heaters, etc. The porous vinyl chloride polymer films of this invention can be prepared either as unsupported films or may be prepared upon any suitable support such as fabrics, paper, etc.

The porous vinyl chloride films of this invention, either as supported and/or unsupported films, may be employed as an upholstering material, as a bandage backing, etc. and in other applications where an air and/or water vapor permeable plastic film is desired.

The above descriptions and particularly the examples are set forth by way of illustration only. Many other variations and modifications thereof will be apparent to those skilled in the art and can be made without departing from the spirit and scope of the invention herein described.

What is claimed is:

1. In the method for preparing a film of a plasticized vinyl chloride polymer in which a plastisol consisting of 100 parts of a vinyl chloride polymer having an average particle size of 0.02–2.0 microns dispersed in 50–200 parts of a plasticizer is extenuated into a thin film and heated to fuse said plastisol film into a homogeneous plasticized vinyl chloride polymer film; the improvement which consists of incorporating about 2–50 parts of water in said plastisol before extenuating same into a film.

2. The method of claim 1 wherein about 5–20 parts of water are incorporated in the plastisol.

3. The method of claim 2 wherein the vinyl chloride polymer employed is a vinyl chloride homopolymer.

References Cited in the file of this patent

UNITED STATES PATENTS

| | | |
|---|---|---|
| 2,386,995 | Wigal | Oct. 16, 1945 |
| 2,754,276 | Walker et al. | July 10, 1956 |